July 21, 1959 F. M. YOUNG 2,896,031

DIFFERENTIAL AMPLIFIER

Filed Oct. 15, 1957 2 Sheets-Sheet 1

INVENTOR
FRANK MANSFIELD YOUNG

BY Joseph Weingarten
ATTORNEY

July 21, 1959 F. M. YOUNG 2,896,031

DIFFERENTIAL AMPLIFIER

Filed Oct. 15, 1957 2 Sheets-Sheet 2

INVENTOR
FRANK MANSFIELD YOUNG

BY Joseph Weingarten
ATTORNEY

United States Patent Office 2,896,031

Patented July 21, 1959

2,896,031

DIFFERENTIAL AMPLIFIER

Frink Mansfield Young, Boston, Mass., assignor to Epsco, Incorporated, Boston, Mass., a corporation of Massachusetts Application October 15, 1957, Serial No. 690,358

7 Claims. (Cl. 179—171)

Figure 1:
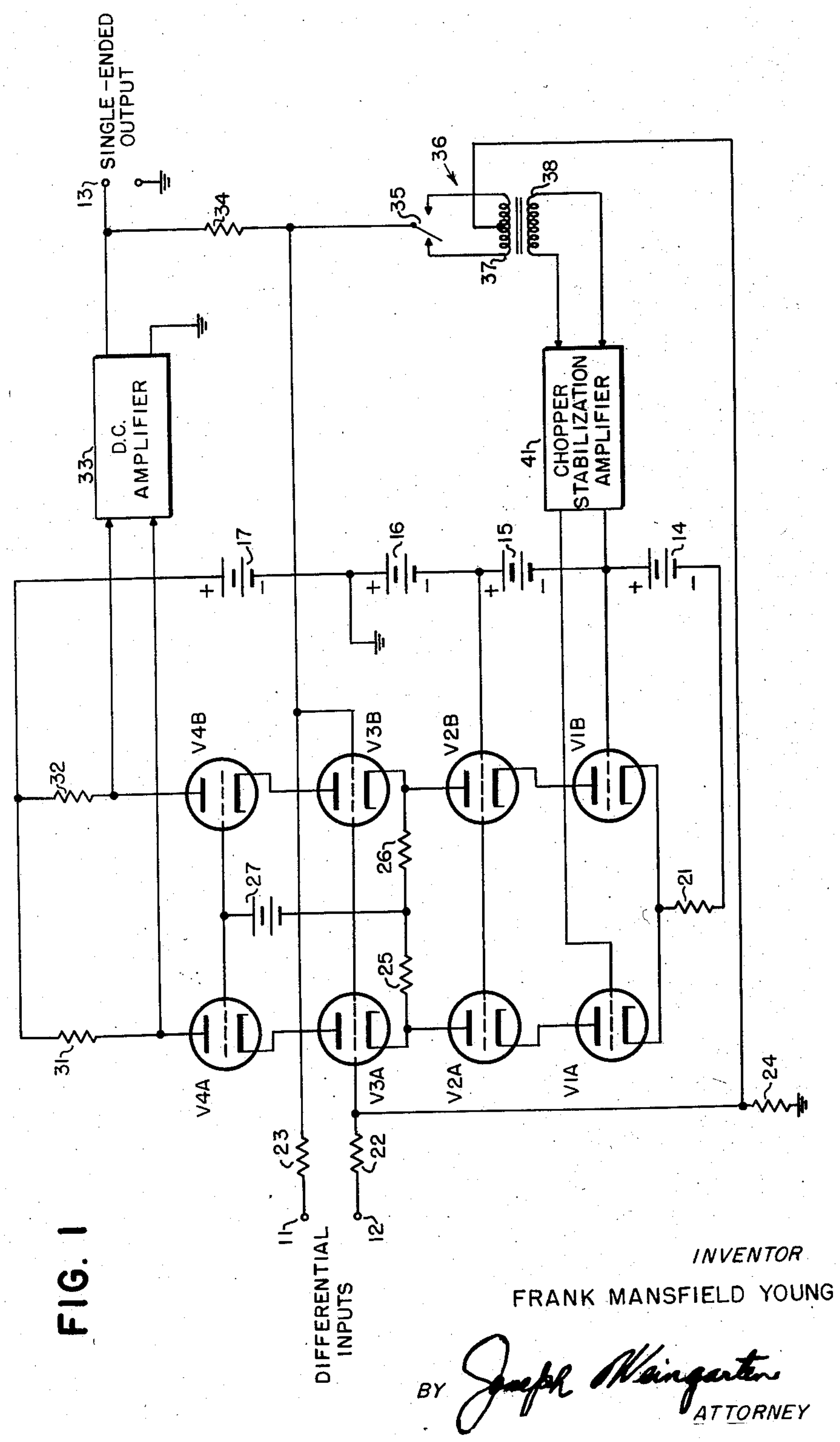

The present invention relates in general to differential amplifiers and more particularly concerns an electrical system which provides an output signal accurately indicative of the amplitude difference between input signals despite wide common variations thereof. Undesired A.-C. or D.-C. common mode potentials, superimposed upon the input signals, are rejected to such an extent that exceedingly accurate indications of very slight amplitude differences are obtained. In addition, the system exhibits extremely low short and long term drift and substantially constant gain despite wide fluctuations in tube characteristics and other circuit parameters.

In a typical form, a differential amplifier comprises a pair of like triode electron tubes having equal load resistors in the respective plate circuits with the grids energized by the respective input signals, the amplitude difference therebetween being indicated by the potential between the two plates. While such an amplifier provides satisfactory operation when the amplitude variation of the input signals is relatively small, the dynamic range is limited. This limitation is especially significant when the input signals have a widely varying common mode. As a result, an accurate representation of the difference between the two input signals is not obtained when the signals vary over relatively wide limits. This is largely due to the difference in tube characteristics being a function of the effective tube operating points which in turn are related to the instantaneous amplitudes of the widely varying input signals. To lessen the effects of such variations, means have been provided for maintaining the total current supplied to the two tubes in the differential amplifier substantially constant. However, operation has still been unsatisfactory for applications where accurate indications of minute differences between two signals, especially over a wide common mode dynamic range, was desired. The inability to obtain the desired accuracies with differential amplifiers has, to a large extent, precluded the use of analog computers in the solution of the many problems which require an exceptionally accurate indication of the difference between two quantities.

The present invention contemplates and has as a primary object the provision of a differential amplifier which continuously provides an accurate indication of even minute differences between input signals despite common mode or other amplitude variations over relatively wide limits, yet is virtually free of drift and insensitive to variations in tube characteristics and other circuit parameters.

It is another object of the invention to provide a differential amplifier in accordance with the preceding object capable of responding to signals over a relatively wide bandwidth.

Still another object of the invention is the provision of an electrical system whose gain remains substantially constant while providing a ground referenced output signal accurately indicative of the difference between two input signals.

According to broad aspects of the invention, the differential amplifier comprises a pair of signal amplifying devices respectively energized by a pair of input signals and means for maintaining the operating point of each insensitive to the common mode of the input signals. Where the signal amplifying devices are electron tubes, both the plate current and plate-cathode potential are independent of the common mode of the input signals.

In a specific form which the invention takes, the signal amplifying devices are a pair of triode electron tubes whose plate currents are regulated by a substantially constant current source comprising a second pair of triode electron tubes having a relatively high unbypassed common cathode resistor. The plate potential on the second pair of tubes is maintained substantially constant by a third pair of triodes respectively placed in the plate circuit of each second pair triode and whose grids are connected to a source of substantially constant potential at which the plates of the second pair of tubes are essentially maintained. The plate-cathode potential of the differential amplifier tubes is maintained substantially constant by a similarly arranged fourth pair of triodes whose grids are tied to a predetermined fixed potential above the differerential amplifier tube cathode potential. Load resistors are connected in the plate circuits of the fourth pair of triodes and the difference signal derived between the plates of the latter two tubes. The input signals are coupled to control grids of the respective differential amplifier tubes.

The balanced difference signal thus obtained is coupled to a conventional direct-current amplifier which provides a ground referenced output signal indicative of the difference between the two input signals. A portion of the output signal is negatively fed back by combining it with one of the input signals. This combined signal is further combined with the other input signal and the latter combination chopped. The chopped combined signals are applied to a chopper stabilization amplifier which provides a balanced output signal wihch is in turn applied to the current regulating tubes to control the ratio of currents drawn by the respective differential amplifier electron tubes.

Figure 2:
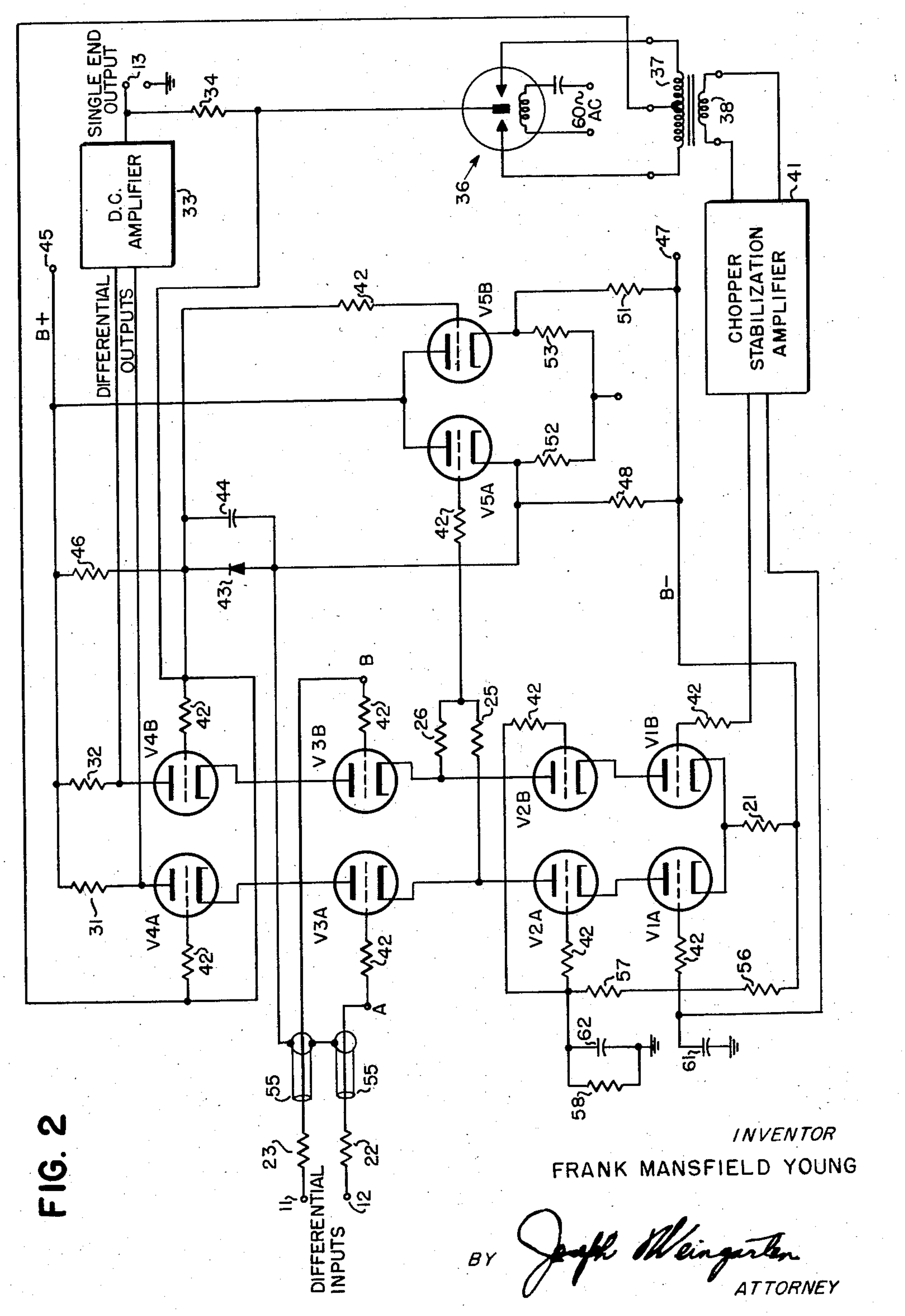

Other features, objects and advantages of the invention will become apparent from the following specification when read in connection with the accompanying drawing in which:

Fig. 1 is a combined block-schematic circuit diagram of a typical form of the invention; and Fig. 2 is a combined block-schematic circuit diagram of a preferred embodiment of the invention.

With reference now to the drawing, and more particularly Fig. 1 thereof, there is illustrated a combined block-schematic circuit diagram of the invention in a form which facilitates understanding the operating principles. These principles will be better understood by first considering the circuit arrangement which provides an output signal on output terminal 13 indicative of the difference between the signals applied to input terminals 11 and 12.

The circuit is seen to comprise four twin triodes, V1, V2, V3 and V4, the left sections being designated by the appended letter A; the right sections, by the appended letter B. Twin-triode V3 and the associated circuitry comprises the differential amplifier whose plate current is regulated by twin-triode V1 and associated circuitry, twin-triode V2 serving to maintain the plate potential of twin-triode V1 substantially constant. The circuitry associated with twin-triode V4 maintains the plate-cathode potential of twin-triode V3 substantially constant. Appropriate potentials are derived across the serially-connected batteries 14, 15, 16 and 17. Resistor 21 is the common cathode impedance for tubes V1A and V1B. The grid of tube V1B is connected to the positive electrode of battery 14. The plates of tubes V1A and V1B are connected to the cathodes of tubes V2A and V2B respectively, whose grids are tied together and connected to the positive electrode of battery 15. The plates of tubes V2A and V2B are connected to the cathodes of tubes V3A and V3B respectively, the grids of the latter tubes being respectively connected through resistors 22 and 23 to input terminals 12 and 11 respectively. The grid of tube V3A is coupled to ground through resistor 24. Resistors 25 and 26 are serially connected between the cathodes of tubes V3A and V3B. The plates of tubes V3A and V3B are connected to the cathodes of tubes V4A and V4B respectively, and the grids of the latter tubes are connected together and coupled to the junction of resistors 25 and 26 by battery 27. The plates of tubes V4A and V4B are coupled to the positive electrode of battery 17 through resistors 31 and 32 respectively and directly to direct-current amplifier 33. Output terminal 13 of direct-current amplifier 33 is coupled through feedback resistance 34 to the grid of tube V3B and to the vibrating arm 35 of chopper 36 which arm is alternately connected to opposite ends of primary winding 37 whose center tap is connected to the grid of tube V3A. The secondary winding 38 is coupled to the input of chopper stabilization amplifier 41 whose output is coupled to the grids of tubes V1A and V1B.

Having described the circuit arrangement, its mode of operation will be discussed. It is convenient to assume that initially the potential on input terminals 11 and 12 is the same fixed value. The entire plate current drawn by twin-triode V3 flows through the relatively high resistance presented by resistor 21. This current is regulated in accordance with the operating point of tubes V1A and V1B. The plate potential on these tubes is maintained substantially constant because twin-triode V2 functions as D.-C. cathode followers whose cathode potentials are tied essentially to the potential of the positive electrode of battery 15. As a result of the constant plate potential and high degree of degeneration introduced by resistance 21, the total current through the A and B sections is accurately controlled by the potential on the grids of tubes V1A and V1B. The balanced signal from chopper stabilization amplifier 41 serves to alter the ratio of currents between the A and B tube sections without altering the total current supplied. Before considering in detail the mode of operation resulting in alteration of the current ratio, it will be helpful to first consider the function of other portions of the system and effects of such alteration.

Twin-triode V4 maintains the plate-cathode potentials of twin-triode V3 unchanged as the common mode of the input signals varies by operating as a D.-C. cathode folower in the same manner as twin-triode V2. This potential is essentially that across battery 27 whose negative terminal is connected to the respective cathodes of twin-triode V3 through isolation resistors 25 and 26. Thus, common variations in the input signals on terminals 11 and 12 effect no changes in the operating points of tube V3A and V3B since both plate current and voltage remain unchanged. However, when there is a difference between the two signals, there is a corresponding change in the ratio of the plate current through and the cathode potential of the two tubes. The corresponding differential change in potential across load resistors 31 and 32 is sensed between the plates of tubes V4A and V4B to derive a balanced output signal. The latter signal is applied to D.-C. amplifier 33, of conventional type, for amplification and conversion to an unbalanced output signal referenced to ground on terminal 13.

When there is a difference in potential upon input terminals 11 and 12 with the former terminal at the ratio of currents in the A and B sections is effected as follows: Assuming a difference in potential between input terminals 11 and 12 wtih the former terminal at the higher potential, a corresponding difference is developed between the grids of twin-triode V3. Chopper 36 responds to this difference in potential to provide a signal across secondary 38 which is amplified in chopper stabilization amplifier 41 to provide a balanced output signal which raises the potential on the grid of tube V1A while lowering the potential on the grid of tube V1B, thereby causing more current to flow through the A sections than the B sections. As a result, the potential on the plate of tube V4A drops below that on the plate of V4B to produce a differential output which is amplified by D.-C. amplifier 33 to provide the output signal on terminal 13 whose sense is such as to lower potential coupled from input terminal 11 to the grid of tube V3B when additively combined therewith. A portion of this output potential is coupled through feedback resistor 34 to the grid of tube V3B; hence, the potential on the grid of tube V3B is the sum of the potential coupled from terminal 11 and the portion of output potential negatively fed back through resistor 34. When the potentials on the grids of twin-triode V3 are the same, no further signal is developed across secondary winding 38 since arm 35 switches between points at the same potential. Accordingly, the current ratio stabilizes at a value indicative of the difference in amplitude between the signals on input terminals 11 and 12, which difference is represented by the potential on output terminal 13.

The net effect of this servoing system, then, is to always generate a correction voltage just sufficient to compensate for the difference in potential between the two input signals, regardless of variations in circuit parameters and drift in D.-C. amplifier 33. The degree of correspondence between the potentials on the grids of twin-triode V3 is related to the magnitude of the loop gain and for high accuracy this is preferably a large value.

Since the signal fed back from resistor 34 to the grid of tube V3B is arranged to maintain the grids of twin-triode V3 at substantially the same potential, the input impedance to difference signals is essentially the sum of resistances 22 and 23 which typically is of the order of 20,000 ohms. However, the actual impedance to ground from either input is considerably in excess of that value and determined by the values of feedback resistor 34 and resistor 24 which typically are of the order of one megohm. Thus, the loading upon the respective circuits which supply the input signals is minimized.

Although an amplitude difference in input signals unbalances the current flow through the A and B tube sections, the total value of current established by twin-triode V1 remains unchanged. Were resistors 31 and 32 connected directly to the plates of twin-triode V3, the plate voltage across each triode section would be a function of the branch currents established by the lower part of the network. Therefore, the gains of tubes V3A and V3B would be unequal and the input signal to D.-C. amplifier 33 less accurately representative of the difference signal.

With reference to Fig. 2, there is illustrated a combined schematic circuit-block diagram of a preferred form of the invention which illustrates certain additional features. Elements in Fig. 2 are designated by the same reference numerals which identify corersponding elements in Fig. 1. The circuit is seen to be essentially that of Fig. 1 with some variations described below, although voltage dividers are substituted for the batteries and a resistor 42 is added in series with each grid for the suppression of parasitic oscillations. The battery 27 of Fig. 1 is replaced by zener diode 43 shunted by a capacitor 44 and connected to the source of positive potential on terminal 45 by resistor 46, thus serving to maintain the plate-cathode potential of twin-triode V3 substantially constant. The other end of zener diode 43 is coupled to the junction of resistors 25 and 26 through cathode follower V5A whose grid is coupled to the latter junction and whose cathode is connected to the source of negative potential on terminal 47 by resistor 48. The grid of cathode follower V5B is connected to the positive end of zener diode 43 and its cathode coupled to terminal 47 by resistor 51.

Resistors 52 and 53 are connected between the cathodes of tubes V5A and V5B to provide at their junction 54 a source of bias for the filaments of twin-triodes V3 and V4, thereby insuring that the maximum allowable cathode-filament potential is not exceeded, even in the presence of widely varying input signals. The outer shield 55 of the shielded cables from input terminals 11 and 12 are also connected to the cathode of V5A to eliminate capacitive effects between the shield and center conductor, thereby improving the high-frequency response of the system. Resistors 56, 57 and 58 are potential dividing resistors and capacitors 61 and 62 bypass unwanted high frequency signals.

The particular system has been described with respect to triodes which advantageously combine linear operation, adequate gain and low noise characteristics. However, the principles of the invention are equally applicable when pentode, transistors or other signal amplifying devices are utilized in a differential amplifier. A system embodying these principles is seen to provide an output signal accurately indicative of relatively minute amplitude differences between a pair of input signals despite wide common variations thereof. Reliable operation virtually free from drift is obtained despite changes in tube characteristics and other parameters. It is apparent that those skilled in the art may make numerous modifications of and departures from the specific embodiments described herein without departing from the inventive concepts. Consequently the invention is to be construed as limited only by the spirit and scope of the appended claims.

What is claimed is:

1. Apparatus for providing an output signal indicative of the difference in amplitude between first and second input signals comprising, a differential amplifier having first and second controllable parameters, means for deriving a difference signal characteristic of the difference between said first and second parameters and amplifying same to derive said output signal, means for combining one of said input signals with said output signal to provide a first combined signal which differs from the other of said input signals by less than the difference between said first and second signals, and means responsive to the difference between said first combined signal and the other of said input signals for altering the difference between said first and second controllable parameters until the difference between said first combined signal and said other of said input signals is less than a predetermined value.

2. Signal translating apparatus for deriving an output signal indicative of the difference in amplitude between first and second input signals which apparatus comprises, a differential amplifier which provides a difference signal indicative of the difference between first and second currents therein, means for amplifying said difference signal to derive said output signal, first and second inputs associated with said differential amplifier, means for coupling said first and second input signals to said first and second inputs respectively, means for negatively feeding back a portion of said output signal to said first input, and means responsive to a difference in amplitude between the signals upon said first and second inputs for altering the difference in said first and second currents until the latter difference in amplitude is substantially zero.

3. Signal translating apparatus for providing upon an output terminal a difference signal indicative of the difference in amplitude between input signals comprising, a differential amplifier having first and second current amplitudes and first and second inputs respectively energized by said input signals, said differential amplifier providing a balanced output signal characteristic of the difference between said first and second current amplitudes, a direct current amplifier energized by said balanced output signal to provide said difference signal on said output terminal, means for negatively feeding back a portion of said difference signal to one of said differential amplifier inputs, means including a chopper for combining the signal on said one differential amplifier input with the input signal on said other differential amplifier input to provide a chopped combined signal, a chopper stabilization amplifier energized by the chopped combined signal to provide a stabilization signal, and means responsive to said stabilization signal for controlling the difference between said first and second current amplitudes.

4. Apparatus for providing an output signal indicative of the difference in amplitude between first and second input signals comprising, a source of first and second currents having a constant sum, a direct current amplifier responsive to the difference between said first and second currents to provide said output signal, means for combining one of said input signals with said output signal to provide a first combined signal, means for combining the other of said input signals with said first combined signal to derive a second combined signal, means for chopping said second combined signal, and means responsive to the chopped second combined signal for controlling the difference between said first and second currents.

5. In a system for providing an output signal indicative of the difference between first and second input signals, apparatus comprising, a differential amplifier having first and second electron tubes each having at least a cathode, plate and control grid, third and fourth electron tubes each having at least a cathode, plate and control grid, a relatively high common load resistor for said cathodes of said third and fourth tubes, fifth and sixth electron tubes each having at least a plate, cathode and control grid, said plates of said fifth and sixth tubes being respectively connected to said cathode of said first and second electron tubes, said cathodes of said fifth and sixth electron tubes being respectively connected to the plates of said third and fourth electron tubes, said control grids of said third and fourth electron tubes being connected together and to a source of substantially constant potential, seventh and eighth electron tubes each having at least a plate, cathode and control grid, said cathodes of said seventh and eighth tubes being respectively connected to the plates of said first and second electron tubes respectively, a pair of resistors serially-connected between the cathodes of said first and second electron tubes, and means for maintaining the potential between the junction of said resistors and each grid of said seventh and eighth electron tubes substantially constant.

6. In a system for providing an output signal indicative of the difference between first and second input signals, apparatus comprising, a differential amplifier having first and second electron tubes each having at least a cathode, plate and control grid, third and fourth electron tubes each having at least a cathode, plate and control grid, a relatively high common load resistor for said cathodes of said third and fourth tubes, fifth and sixth electron tubes each having at least a plate, cathode and control grid, said plates of said fifth and sixth tubes being respectively connected to said cathodes of said first and second electron tubes, said cathodes of said fifth and sixth electron tubes being respectively connected to the plates of said third and fourth electron tubes, said control grids of said third and fourth electron tubes being connected together and to a source of substantially constant potential, seventh and eighth electron tubes each having at least a plate, cathode and control grid, said cathodes of said seventh and eighth tubes being respectively connected to the plates of said first and second electron tubes respectively, a pair of resistors serially-connected between the cathodes of said first and second electron tubes, and means including a zener diode for maintaining the potential between the junction of said resistors and each grid of said seventh and eighth electron tubes substantially constant.

7. In a system for providing an output signal indicative of the difference between first and second input signals respectively applied to first and second input terminals and subject to common mode variations, apparatus comprising, a differential amplifier formed of first and second electron tubes each having at least a cathode, plate and control grid, third and fourth electron tubes each having at least a cathode, plate and control grid, said cathodes of said third and fourth tubes being connected to a relatively high common cathode resistor, fifth and sixth electron tubes each having at least a plate, cathode and control grid, said cathodes of said fifth and sixth tubes being respectively connected to the plates of said third and fourth tubes, said plates of said fifth and sixth tubes being respectively connected to the cathodes of said first and second tubes, said control grids of said fifth and sixth tubes being connected to a source of substantially constant potential, a pair of resistors serially-connected between said cathodes of said first and second tubes, seventh and eighth electron tubes each having at least a plate, cathode and control grid, said cathodes of said seventh and eighth tubes being respectively connected to the plates of said first and second tubes, means for maintaining the potential between the junction of said resistors and each grid of said seventh and eighth tubes substantially constant, a pair of load resistors respectively connected in the plate circuits of said seventh and eighth electron tubes, a direct-current amplifier, means for coupling said plates of said seventh and eighth electron tubes to the input of said direct-current amplifier, means including shielded cables for coupling said first and second input terminals to said control grids of said first and second tubes respectively, means for coupling the output of said direct-current amplifier to said control grid of said second tube, means responsive to said common mode variations for deriving a potential for biasing the filaments of said first, second, seventh and eighth electron tubes to prevent the maximum cathode-filament potential rating of the respective tubes from being exceeded, means for coupling said biasing potential to the shields of said shielded cables, means for deriving a signal indicative of the difference in potential between said control grids of said first and second electron tubes for application to the control grids of said third and fourth electron tubes including a transformer, a chopper for providing an output signal across the secondary of said transformer when there is a difference in potential between said first and second electron tube grids, a chopper stabilization amplifier whose input is coupled to said secondary and whose output is coupled to the control grids of said third and fourth electron tubes, thereby altering the difference in plate currents flowing through said first and second tubes in a manner which reduces the difference between grid potentials thereof.

References Cited in the file of this patent

UNITED STATES PATENTS

| | | |
|---|---|---|
| 2,424,893 | Mansford | July 29, 1947 |
| 2,677,729 | Mayne | May 4, 1954 |
| 2,780,682 | Kelin | Feb. 5, 1957 |